Dec. 11, 1951 M. A. ROLLMAN 2,577,916
ICE-CREAM FREEZER
Filed Oct. 11, 1947 2 SHEETS—SHEET 2
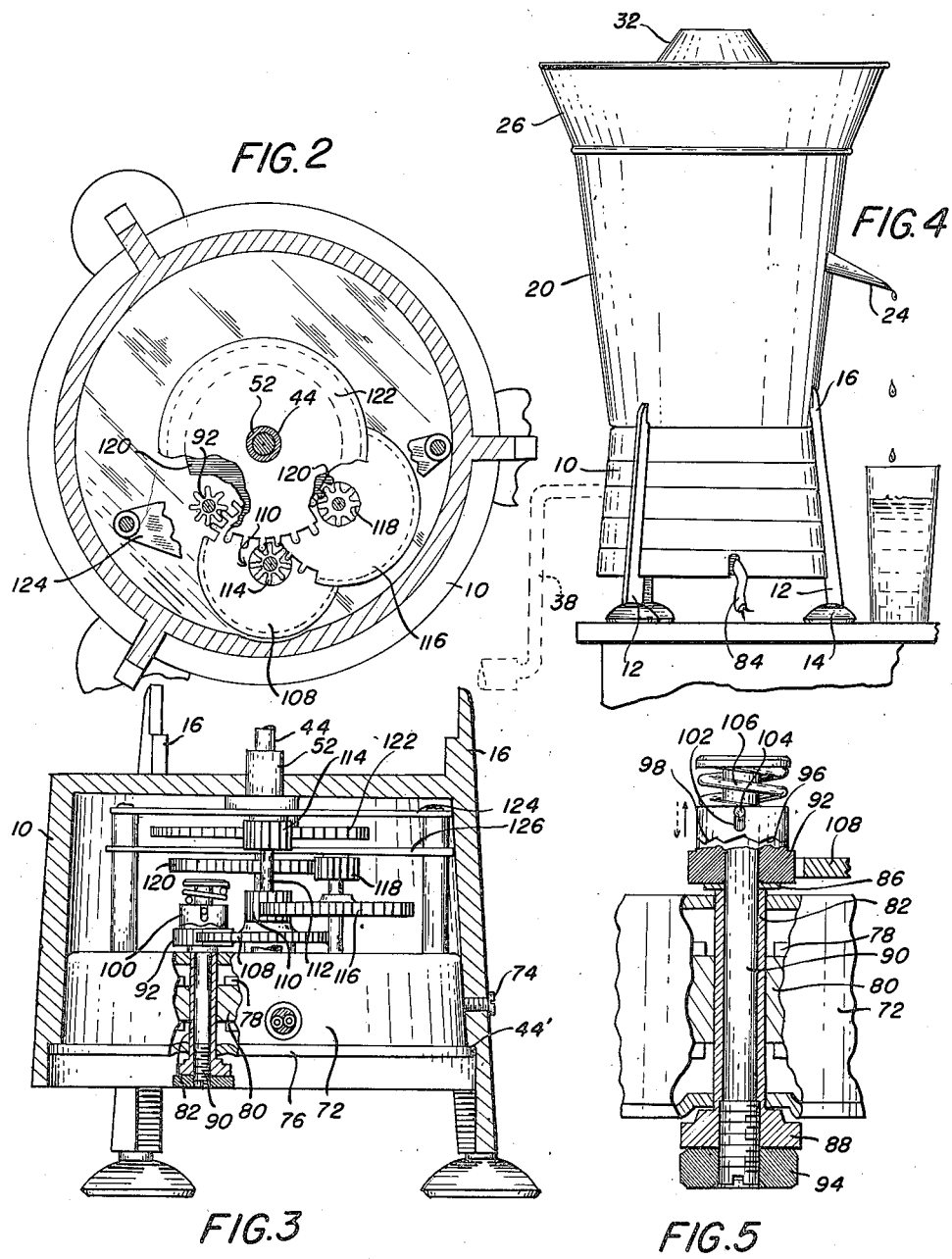
INVENTOR.
MICHAEL A. ROLLMAN
BY
ATTY.

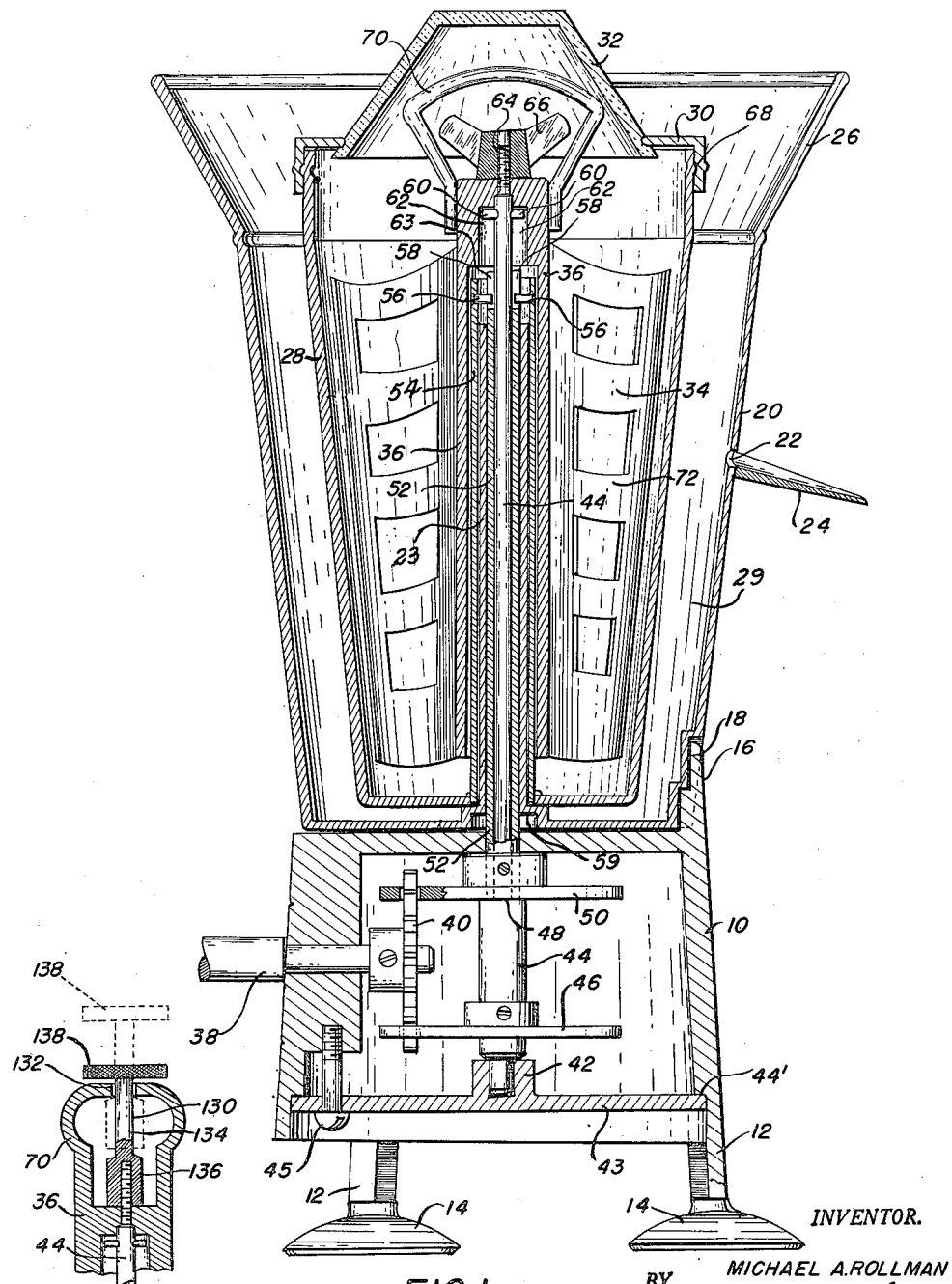

Patented Dec. 11, 1951

2,577,916

UNITED STATES PATENT OFFICE 2,577,916

ICE-CREAM FREEZER

Michael A. Rollman, Landisville, Pa.

Application October 11, 1947, Serial No. 779,294

11 Claims. (Cl. 62—114)

This invention relates to improvements in ice cream freezers and preferably, but without limitation thereto, to small sized freezers for household use.

In conventional ice cream freezers, it has generally been customary to provide operating means positioned at the top of the freezer for purposes of rotating the ice cream can in which the cream is contained and the agitator mounted within the can. The positioning of the operating mechanism at the top of the freezer resulted in a number of disadvantages such as obstructing the ready filling of the ice receptacle with ice, leakage of oil from the gearing of said mechanism into the cream can, leakage of salt water into the gearing of said operating mechanism which resulted in rusting of the gears, and also providing an awkward position for the operating mechanism in regard to holding the freezer stationary while actuating the operating mechanism manually.

It is an object of the present invention to overcome the foregoing difficulties by providing a freezer in which the operating mechanism is mounted below the ice receptacle, and also providing suction cups on the base so that the freezer can be readily mounted in a substantially stationary position on a suitable supporting surface.

It is a further object of the invention to provide the ice cream can with a transparent closure so that progress of the freezing operation may be readily observed, such observation being unobstructed since the operating mechanism of the freezer is mounted below the ice receptacle.

A still further object of the invention is to provide a relatively small space between the ice cream can and the ice receptacle so as to economize on the use of ice, but the upper rim of the ice receptacle is preferably flared to facilitate the introduction of ice into the space therefor between the ice cream can and receptacle and also permit placing a greater quantity of ice at the top of the receptacle from which location it may move downward as the ice nearer the bottom of the receptacle melts and flows from the usual overflow spout of the receptacle.

Still another object of the invention is to so construct the casing for the operating mechanism and the ice receptacle so that the same readily lend themselves to attractively streamlining the entire freezer and base in such a manner as to present a contour pleasing in appearance and free from unsightly projections.

Details of these objects as well as of the invention and other objects thereof are set forth in the following specification and illustrated in the accompanying drawings forming a part thereof.

In the drawings:

Fig. 1 is a vertical sectional elevation of one embodiment of an ice cream freezer comprising the present invention.

Fig. 2 is a fragmentary sectional plan view of the operating mechanism mounted within the base of a freezer comprising another embodiment of the invention.

Fig. 3 is a vertical sectional view through the base of the freezer shown in Fig. 2 and showing details of the operating mechanism.

Fig. 4 is a side elevational view of the freezer.

Fig. 5 is a fragmentary sectional view showing details of a clutch embodied in the operating mechanism shown in Fig. 3.

Fig. 6 is a fragmentary sectional elevation of another embodiment of a detail of the invention.

Referring to the drawings, a base 10 is provided with a hollow interior in which the operating mechanism of the freezer is positioned. Said base preferably has depending legs 12 on the lower ends of which suction cups 14 are provided in the preferred embodiment of the invention for purposes of securing the freezer to a suitable supporting surface, such as a table. Projecting upward at spaced intervals from the base 10 are a plurality of prongs 16 which are received within indentations 18 formed in the lower portion of the sides of an ice receptacle 20. The indentations 18 and prongs 16 prevent relative rotation between said receptacle and base of the freezer. If desired, in lieu of this arrangement, indentations 18 may be eliminated and a horizontally projecting lug on the receptacle may engage a prong 16 to prevent rotation. The receptacle 20 is also provided with an overflow aperture 22 through which the liquid coolant, comprising melted ice and salt, flows as waste down spout 24 into a suitable container or sink. The outer end of spout 24 extends past a vertical projection to the perimeter of the base 10.

The bottom of the receptacle 20 is centrally provided with an aperture to the perimeter of which is integrally joined the lower end of a tube 23 which extends upward a substantial distance above the level of overflow aperture 22 in the side of the receptacle to prevent melted ice from flowing down tube 23 and into the base of the receptacle. The upper portion of the receptacle 20 terminates in a flared mouth 26 so as to facilitate the introduction of ice into the receptacle and also to permit packing around the upper portion of the ice cream can 28 reserve ice which will gradually work downward.

As will be noted from Fig. 1 particularly, the space 29 is narrow and, for example, in a two-quart size freezer, such space will be between ½" and ¾" wide. This will permit maximum efficiency from a limited quantity of ice such as may be obtained from several standard ice cube trays of mechanical refrigerators. Such cubes may be broken into small particles in an ice cracker. A closure 30 is detachably secured to the upper end of the can 28 and is either made in its entirety from transparent material such as a suitable synthetic resinous compound or glass, or the closure may be provided with a transparent window member 32 which in the preferred embodiment is dome-like or cup-shaped as shown in Fig. 1. Through said window member, the progress of the freezing operation within the can 28 may be readily observed without obstruction.

A dasher or agitator 34 is mounted within the can 28 for rotation relative thereto and preferably in an opposite direction from that of the can. The central portion 36 of the agitator is tubular for purposes to be described.

Referring now to the details of the operating mechanism, this invention presents two embodiments. In the embodiment shown in Fig. 1, manual operation is contemplated. In this embodiment, a drive-shaft 38 is mounted within a suitable bearing in one side wall of the base 10, a stamped sheet metal spur gear 40 being mounted on the inner end of said shaft. Rotatably mounted in a bearing in a boss 42 on the bottom wall 43 of the base 10 is one end of a shaft 44. Bottom wall 43 is detachably fixed against an annular shoulder 44' in the base 10 by a plurality of screws 45 of which only one is shown. Secured to said shaft is a disc-like gear plate 46 comprising an annular series of apertures adjacent the periphery of the plate, said apertures successively receiving the teeth of the spur gear 40 to drive the gear plate 46 in one direction. The upper part and major portion of the shaft 44 has a smaller diameter than the lower portion to provide an annular shoulder 48. Mounted for rotation relative to said shoulder is another gear plate 50 similar to gear plate 46. Both of said gear plates may be inexpensively made by stamping from sheet metal. Gear plate 50 is secured to a driving tube 52. When the spur gear 40 is rotated, it will be seen that gear plate 46 will be rotated in one direction while gear plate 50 will be rotated in the opposite direction by said gear 40. Tube 23 of the receptacle 20 is mounted telescopically over driving tube 52, the latter being rotatable within tube 23 which remains stationary.

The ice cream can 28 is provided centrally thereof with a tube 54 which telescopically fits over tube 23 of the receptacle, the tube 54 extending upward to a position well above the level of aperture 22 in the ice receptacle 20 and slightly above the upper end of tube 23. Said tube 54 is integral with the bottom of the ice cream can 28, and thus melted ice within the receptacle 20 will not pass into the interior of the can 28. Tube 54 of ice cream can 28 is detachably connected to driving tube 52 so as to rotate the ice cream can 28 in the same direction as gear plate 50. Detachable connection between the ice cream can 28 and driving tube 52 is effected by means of oppositely projecting pins 56 which are fixed to tube 54 and are respectively received in parallel slots 58 formed in the upper end of driving tube 54. A boss 59, formed in the bottom of receptacle 20 engages the bottom of ice cream can 28 to maintain the respective bottoms spaced from each other.

Shaft 54 drives or rotates the agitator 34 by means of a transverse pin 60 mounted in the upper end of the shaft and received within opposed slots 62 which project upward from horizontal surface 63. In view of the opposite directions in which gear plates 46 and 50 rotate, it will thus be seen that ice cream can 28 and agitator 34 rotate in opposite directions when the operating mechanism described above is actuated. Due to tube 23 in the receptacle 20, no melted ice can escape into the base 10 during operation of the freezer.

The ice cream can 28 and agitator 34 are respectively held assembled in connection with their driving pins 56 and 60 by means comprising a threaded end 64 on the upper end of shaft 44 and a wing nut 66 which is threaded onto end 64 to detachably secure the afore-mentioned parts in operative assembly. Said wing nut 66 also serves to maintain the receptacle 20 assembled to base 10 since surface 63 in agitator tube 36 prevents upward movement of tube 54 in the ice cream can and the ice cream can bottom will prevent the bottom of the receptacle from moving upward.

The closure 30 is preferably detachably secured to the upper end of ice cream can 28 by any suitable means such as arrangement 68 comprising a pair of opposed bayonet slots and projections. When the closure 30 has been removed from the ice cream can 28, the agitator 34 may be readily removed from the interior of the can by removing wing nut 66 from the end of shaft 44 and grasping handle 70 which is fixed to the upper end of the central portion of agitator 34. Said handle is merely one example of a number which may be provided for this purpose.

The side blades of agitator 34 are preferably curved in transverse plan view and the connecting webs 72 are each preferably bent or skewed so as to be disposed at an angle to the vertical, and resemble a propeller-like impeller, whereby rotation of the agitator 34 results in the cream mixture within the ice cream can being moved from the bottom of the can toward the top. Circulation of the mixture is thus facilitated during the freezing operation. To further facilitate such movement, the ice cream can 28, as well as the receptacle 20, is frusto-conical in shape, tapering outward and upward as is clearly shown in Figs. 1 and 4.

As will be also readily seen from Fig. 1, the upper portion of the tubular central part of agitator 34 forms a closure for tubes 52 and 54. Following the removal of wing nut 66, if desired, the ice cream can 28 containing the frozen cream and agitator 34 may be removed from the receptacle 20 and in this way facilitate the removal of the frozen cream from the ice cream can without danger of ice or salt from the receptacle 20 falling into the ice cream can 28. The tapered walls of the ice cream can 28 also render it readily removable from packed ice within receptacle 20.

In the other embodiment of the invention, it is contemplated that driving tube 52 for the ice cream can 28 and shaft 44 which drives agitator 34 may be driven by gearing powered by an electric motor. Such gearing for this embodiment is illustrated in detail in Figs. 2 through 5.

An electric motor casing 72 is mounted within base 10 by suitable means such as a plurality of set screws 74 of which only one is shown. The casing 72 preferably has a flange 76 which abuts annular shoulder 44' within base 10. The motor comprises a field 78 within the casing 72. Armature 80 is fixed to sleeve 82 which comprises the drive shaft of the motor. Current is supplied to the motor by a conduit 84.

Abutting the upper end of sleeve 82 is a washer 86. The lower end of sleeve 82 terminates in a head 88 which is threadably apertured centrally thereof. A shaft 90 which is headed at its upper end extends through sleeve 82, the lower end of the shaft being threaded into head 88 of said sleeve. Drive gear 92 is rotatably mounted on shaft 90 but normally is driven by said shaft through a clutch mechanism to be described. Shaft 90 is adjustably secured to sleeve 82 by a lock nut 94.

One face of gear 92 is provided with a frictional face such as radial serrations 96 which co-engage a frictional face comprising radial serrations 98 on drive member 100. Said member has a slot 102 which accommodates a pin 104 fixed to shaft 90. A spring 106 urges drive member 100 into frictional engagement with drive gear 92. When the clutch which has been described yields or slips, it does so with a clattering sound which serves as a signal for purposes to be described.

Due to the characteristic high speed of the motor in casing 72, stepdown gearing is necessary to connect drive gear 92 with shaft 44 and sleeve 52. Thus, gear 92 which is a pinion gear drives large gear 108 which is secured to pinion 110 and shaft 112. Also secured to shaft 112 is another pinion 114. Pinion 110 drives large gear 116 which is fixed on a common shaft with pinion 118 and comprises a reversing gear. Pinion 118 drives large gear 120 which is fixed to shaft 44, whereby gear 120 corresponds to gear 46 in the manual embodiment of the invention shown in Fig. 1. Pinion 114 drives large gear 122 which is secured to drive sleeve 52, whereby gear 122 corresponds to gear 50 in the embodiment shown in Fig. 1. Thus, as in Fig. 1, gear 122 drives the ice cream can in one direction while gear 120, due to reversing gear 116, drives agitator 34 in the opposite direction. Apertured frame plates 124 and 126 provide suitable bearings for the various shafts which support the afore-mentioned gears and pinions. The motor casing 72 functions similarly.

The view of the gears shown in Fig. 2 is somewhat diagrammatic to render the disclosure as simple as possible. All of the teeth on the gears and pinions have not been illustrated but it is to be understood that all of said gears and pinions are actually provided with teeth around their entire peripheries.

When the power driven embodiment of the invention shown in Figs. 2 through 5 is operated to make ice cream, after the consistency of the frozen mixture is sufficiently viscous that no further agitation is necessary, the clutch described above will slip. It is not necessary for the operator to be present with the freezer during the freezing operation. Thus, the particular clutch illustrated and described herein is advantageous to summon the operator by means of the signal provided by the clattering of the clutch facings 96 and 98 when the clutch slips. The tension of drive member 100 on drive gear 92 may be adjusted by manipulating shaft 90 relative to sleeve 82. When the desired pressure is achieved, lock nut 94 will maintain the adjustment. Thus, the clutch may be adjusted so that slipping thereof will occur only after the mixture within the ice cream can has been frozen to the desired consistency which may be determined according to individual taste and requirements. All other advantages inherent to the embodiment shown in Fig. 1 are present in the power driven embodiment shown in Figs. 2 through 5.

As another embodiment of means to retain the agitator 34 assembled on the shaft 44, a nut assembly 130 may be used in lieu of wing nut 66, as shown in Fig. 6. Adaptation of nut assembly 130 to the agitator requires modifying the handle 70 thereof to provide an aperture 132 through which the stem 134 of the assembly 130 passes for free rotation therein. The lower end 136 of stem 134 is internally threaded as shown to engage threaded upper end of shaft 44. To the upper end of stem 134 is fastened a knob 138 by which the assembly 130 is manipulated for rotation as well as between the full and dotted line positions thereof shown in Fig. 6. The knob is fastened to the stem after assembly thereof within the handle 70. By means of this construction, it is impossible to loosen the nut assembly from the agitator.

Further, the foregoing construction provides means for readily starting the removal of the agitator from the can 28. When the latter is filled with nearly frozen ice cream, the removal of the agitator from the can is difficult, especially when initially "breaking" the agitator from its position within the ice cream at the time agitation is finally stopped. To initiate such removal, after unscrewing the assembly 130 from threaded engagement with stem 44, the operator can, for example, place the thumb of one hand on top of knob 138 and the index and middle fingers respectively through the loop or curved portions of handle 70 at either side of stem 134. Upward movement of said fingers readily commences upward movement of the agitator.

This embodiment of this detail of the invention illustrated in Fig. 6 applies equally well to the manual or power driven embodiments of the invention.

While the invention has been illustrated and described in its preferred embodiments and has included certain details, it should be understood that the invention is not to be limited to the precise details herein illustrated and described since the same may be carried out in other ways, falling within the scope of the invention as claimed.

What I claim is:

1. An ice cream freezer comprising in combination, an ice receptacle, a can mounted for rotation within said receptacle about a normally vertical axis, an agitator mounted for movement within said can, a closure supported solely by said can, interengageable means on said closure and can operable detachably to connect them together, and operating means disposed below said receptacle and connectible with said can and operatable agitator to rotate the same independently of each other.

2. An ice cream freezer comprising in combination, an ice receptacle, a can mounted for rotation within said receptacle, an agitator mounted for movement within said can, a closure for said can, and power driven operating means including a yieldable clutch disposed below said receptacle and connectible with said can and agitator to rotate the same.

3. An ice cream freezer comprising in combination, an ice receptacle, a can mounted for rotation within said receptacle, an agitator mounted for movement within said can, a closure for said can, and operating means disposed below said receptacle and connectible with said can and agitator to rotate the same, said operating means including a shaft and telescoping sleeve operatively connected one to the can and the other to the agitator.

4. An ice cream freezer comprising in combination, an ice receptacle provided with an aperture in the bottom thereof, a tube extending upward into said receptacle and fixed in a watertight manner to the perimeter of said aperture, a can mounted for rotation within said receptacle, an agitator mounted for movement within said can, and operating means disposed below said receptacle and connectible with said can and agitator to rotate the same, said operating means comprising a shaft and telescoping sleeve mounted within the tube of said receptacle and operatively connected one to the can and the other to the agitator.

5. An ice cream freezer comprising in combination, an ice receptacle having a drain aperture to maintain therein a predetermined level of liquid coolant, a can mounted for rotation within said receptacle and provided centrally thereof with a tube integral therewith and extending upward from the bottom thereof to a height above said level of coolant in said receptacle, an agitator mounted for movement within said can, a closure for said can, and operating means disposed below said receptacle and connectible with said can and agitator to rotate the same, said operating means including a shaft and telescoping sleeve operatively connected one to the can and the other to the agitator and said shaft and sleeve both being disposed within said tube of said can.

6. An ice cream freezer comprising in combination, an ice receptacle having a drain aperture to maintain therein a predetermined level of liquid coolant, a can mounted for rotation within said receptacle and provided centrally thereof with a tube integral therewith and extending upward from the bottom thereof to a height above said level of coolant in said receptacle, an agitator mounted for movement within said can and provided centrally thereof with a tube surrounding the tube of said can, a closure for said can, and operating means disposed below said receptacle and connectible with said can and agitator to rotate the same, said operating means including a shaft and telescoping sleeve operatively connected one to the can and the other to the agitator and said shaft and sleeve both being disposed within said tube of said can.

7. An ice cream freezer comprising in combination, an ice receptacle, a can mounted for rotation within said receptacle, an agitator mounted for movement within said can, a closure for said can, and operating means disposed below said receptacle and connectible with said can and agitator to rotate the same, said operating means including a shaft and telescoping sleeve operatively connected respectively to the agitator and can.

8. An ice cream freezer comprising in combination, an ice receptacle, a can mounted for rotation within said receptacle about a normally vertical axis, an agitator mounted for movement within said can about a normally vertical axis, a closure detachably connected to and supported solely by the upper end of said can and having a transparent portion through which the interior of said can may be viewed, said transparent portion being positioned above the normal ice level within said ice receptacle, and operating means disposed below said receptacle and connectible with said can and agitator to rotate the same.

9. An ice cream freezer comprising in combination, an ice receptacle, a can mounted for rotation within said receptacle about a normally vertical axis, an agitator mounted for movement within said can, a closure for said can detachably secured to the upper end thereof for movement therewith and provided with a dome-like transparent portion extending above the normal ice level within said ice receptacle and through which the interior of said can may be viewed, and operating means disposed below said receptacle and connectible with said can and agitator to rotate the same.

10. An ice cream freezer comprising in combination, an ice receptacle having an open top terminating in an annular outwardly and upwardly flared rim, a can supported at its bottom and mounted for rotation within said receptacle about a normally vertical axis, the upper end of said can being below the upper edge of said flared rim, an agitator mounted for movement within said can, a closure for said can having an upwardly extending central transparent portion projecting above the upper edge of said flared rim, and operating means disposed below said receptacle and connectible with said can and agitator to rotate the same.

11. An ice cream freezer comprising in combination, an ice receptacle, a can mounted for rotation within said receptacle, an agitator mounted for movement within said can, a closure for said can, a base disposed below said receptacle, legs spaced around and extending vertically above said base, said extensions of said legs interengaging said receptacle to prevent relative rotation therebetween, and operating means within said base and connectible with said can and agitator to rotate the same.

MICHAEL A. ROLLMAN.

REFERENCES CITED

The following references are of record in the file of this patent:

UNITED STATES PATENTS

| Number | Name | Date |
|---|---|---|
| 663,137 | Turner | Dec. 4, 1900 |
| 941,172 | Row | Nov. 25, 1909 |
| 970,846 | Miller | Sept. 20, 1910 |
| 1,210,727 | Tyson | Jan. 2, 1917 |
| 1,295,684 | Bouqin | Feb. 25, 1919 |
| 1,756,261 | Pfouts | Apr. 29, 1930 |
| 1,936,723 | Lindsay | Nov. 28, 1933 |
| 1,956,701 | Smith | May 1, 1934 |
| 1,978,176 | Steenstrup | Oct. 23, 1934 |
| 2,194,719 | Parrish | Mar. 26, 1940 |
| 2,411,600 | Space | Nov. 26, 1946 |
| 2,443,733 | Karge | June 22, 1948 |